United States Patent
Finger et al.

(10) Patent No.: US 11,374,498 B2
(45) Date of Patent: Jun. 28, 2022

(54) SWITCHING CONVERTER FOR POWER DOMAIN SEPARATION

(71) Applicant: Analog Devices International Unlimited Company, Limerick (IE)

(72) Inventors: Charles Finger, Milwalkie, OR (US); Jian Li, San Jose, CA (US); Zhouyuan Shi, Fremont, CA (US); Xu Zhang, Milpitas, CA (US)

(73) Assignee: Analog Devices International Unlimited Company, Limerick (IE)

( * ) Notice: Subject to any disclaimer, the term of this patent is extended or adjusted under 35 U.S.C. 154(b) by 112 days.

(21) Appl. No.: 16/918,917

(22) Filed: Jul. 1, 2020

(65) Prior Publication Data

US 2021/0021194 A1 Jan. 21, 2021

Related U.S. Application Data

(60) Provisional application No. 62/876,366, filed on Jul. 19, 2019.

(51) Int. Cl.
*H02M 3/158* (2006.01)
*H02M 3/07* (2006.01)
*H02M 1/00* (2006.01)

(52) U.S. Cl.
CPC .......... *H02M 3/1584* (2013.01); *H02M 3/07* (2013.01); *H02M 1/0006* (2021.05); *H02M 1/0025* (2021.05)

(58) Field of Classification Search
None
See application file for complete search history.

(56) References Cited

U.S. PATENT DOCUMENTS 5,173,621 A 12/1992 Fraser et al.
5,438,277 A 8/1995 Sharpe-geisler
(Continued)

FOREIGN PATENT DOCUMENTS

KR 20100072238 A 6/2010

OTHER PUBLICATIONS

"Chinese Application Serial No. 202021417135.5, Office Action dated Dec. 23, 2020", w/ English Machine Translation, 4 pgs.
(Continued)

*Primary Examiner* — Jeffrey A Gblende
(74) *Attorney, Agent, or Firm* — Schwegman Lundberg & Woessner, P.A.

(57) ABSTRACT

A power domain isolation system, such as without requiring a transformer, can include a reactive circuit, an input network having first and second input nodes that are coupled in parallel with the reactive circuit via respective first and second current control circuits, and an output network having first and second output nodes that are coupled in parallel with the reactive circuit via respective third and fourth current control circuits. The first and second current control circuits can be configured to couple the reactive circuit to the input nodes when the third and fourth current control circuits are configured to electrically isolate the reactive circuit from the output nodes, and the first and second current control circuits can be configured to electrically isolate the reactive circuit from the input nodes when the third and fourth current control circuits are configured to couple the reactive circuit to the output nodes.

19 Claims, 5 Drawing Sheets

(56) References Cited

U.S. PATENT DOCUMENTS

| | | | |
|---|---|---|---|
| 6,559,689 B1* | 5/2003 | Clark | H03K 17/063 |
| | | | 327/337 |
| 7,239,853 B2 | 7/2007 | Kearns | |
| 7,242,911 B2 | 7/2007 | Yu | |
| 7,522,433 B2* | 4/2009 | Delano | H02M 3/07 |
| | | | 363/59 |
| 8,049,479 B2 | 11/2011 | Shiraishi et al. | |
| 9,018,892 B2 | 4/2015 | Agarwal et al. | |
| 9,225,239 B2* | 12/2015 | Williams | H02M 3/07 |
| 9,785,172 B2 | 10/2017 | Agarwal et al. | |
| 9,887,014 B2* | 2/2018 | Zanchi | G11C 27/026 |
| 10,778,098 B2* | 9/2020 | Yang | H02M 7/4837 |
| 2011/0241766 A1* | 10/2011 | Zhang | H02M 3/07 |
| | | | 327/536 |
| 2021/0013814 A1* | 1/2021 | Fujita | H01G 4/40 |

OTHER PUBLICATIONS

"Chinese Application Serial No. 202021417135.5, Response filed Mar. 8, 2021 to Office Action dated Dec. 23, 2020", w/ English Claims, 17 pgs.

Peter, Pradeep K., et al., "Analysis and Design of a Ground Isolated Switched Capacitor DC-DC Converter", IEEE International Symposium on Industrial Electronics, Bari, IT, (Jul. 2010), 6 pgs.

* cited by examiner

SWITCHING CONVERTER FOR POWER DOMAIN SEPARATION

CROSS-REFERENCE TO RELATED APPLICATIONS

This application is related to and claims priority to U.S. Provisional Application No. 62/876,366, filed on Jul. 19, 2019, and entitled "SWITCHED CAPACITOR CONVERTER FOR POWER GROUND SEPARATION," the entirety of which is incorporated herein by reference.

BACKGROUND

A DC-DC power converter is a class of power converter used to convert a direct current (DC) signal from one voltage level to another, or to invert an input signal. Such a power converter is commonly used in electronic devices that are powered by regulated DC voltages. DC-DC converters can be particularly useful in applications with different subsystems that can require or use different voltage input levels.

Some DC-DC converters can include or use a magnetic energy storage mechanism, such as an inductor or transformer. The output voltage in such converters can be controlled by modulating a duty cycle of a signal used to charge the inductive component. Buck and boost converters are examples of DC-DC converters that include or use a magnetic energy storage element.

At least one challenge associated with boost and buck converters are reduced efficiency at high switching frequencies, as well as relatively high power loss. At least one other challenge associated with boost and buck converters is the physically large size of, and expense associated with, magnetic energy storage elements such as inductors or transformers.

In some examples, a switched capacitor converter circuit can be used to step-up, step-down, or invert a supply voltage signal. Input and output signals of typical switched capacitor converters can have a common reference, such as ground. Switched capacitor converters can be relatively small in physical size and generally have low power handling capabilities, for example, less than about 5 Watts.

BRIEF SUMMARY OF THE DISCLOSURE

The present inventor has recognized, among other things, that a problem to be solved includes providing a power converter circuit that can be used to provide isolation between different power domains. Different power domains can include power signals that have different reference levels or ground signal levels. The present inventor has recognized that the problem can include providing a ground isolation circuit that does not require a transformer. In an example, the problem includes providing a converter with a non-inverting output using a minimum number of standard circuit components, and further includes providing a continuous output signal with low ripple and minimal output filtering.

In an example, a solution to the above-described problem can include or use a switched converter system with an energy-storage component. The solution can include an input network configured to receive or provide signals in a first power domain and an output network configured to receive or provide other signals in a different second power domain. In an example, the energy-storage component can include a reactive component that is coupled between the input and output networks. During respective different phases of operation, at least one of the input network or the output network can be electrically isolated from the energy-storage component. That is, at any given time irrespective of a phase of operation of the converter, at least one of the first power domain and the second power domain can be electrically isolated from the other power domain. In an example, only one of the power domains can be electrically coupled to the energy-storage component at any given time. In an example, the input network and the output network can include respective current blocking circuitry to facilitate bidirectional current signal blocking from the energy-storage component.

In an example, a solution to the above-mentioned problems can include a transformerless power domain switching module for decoupling an input power signal having a first reference level from an output power signal having a second reference level, wherein a difference between the first and second reference levels is between about 1 and 10 volts. The solution can include a signal-side isolation path comprising at least first and second back-to-back FET assemblies coupled in series between a signal-side input node and a signal-side output node, a reference-side isolation path comprising at least third and fourth back-to-back FET assemblies coupled in series between a reference-side input node and a reference-side output node. The solution can include or use an energy storage circuit, or reactive component, coupled to a first intermediate node in the signal-side isolation path between the first and second FET assemblies, and coupled to a second intermediate node in the reference-side isolation path between the third and fourth FET assemblies.

This brief summary is intended to provide an overview of subject matter of the present patent application. It is not intended to provide an exclusive or exhaustive explanation of the invention. The detailed description is included to provide further information about the present patent application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Power systems can include one or more voltage or current converter circuits. A converter circuit can receive an electrical input signal having various input signal characteristics such as magnitude, frequency, and/or phase characteristics. In response to the input signal, the converter circuit can provide an electrical output signal, such as having characteristics that are similar to or different from those of the input signal.

Power systems can include one or more switches configured to adjust an output signal magnitude, frequency, reference level, and/or phase. Some power systems can include an isolation circuit, such as a transformer, to electrically isolate a converter output stage from a converter input stage using respective sides of the transformer.

Switched-mode converter circuits, or switching regulators, can provide power conversion, such as including output signal voltage or current regulation, such as using transistor switches that are either on or off. That is, in a switched-mode converter, the transistors may not operate in a linear region in which both switch current and switch voltage are nonzero. In an example, at least one of transistor current and transistor voltage is close to zero at all times, and accordingly power dissipation is minimized.

In an example, a switching regulator is configured to generate a regulated voltage. For example, a switching regulator can include one or more switches that can be turned on or off according to a duty cycle. The duty cycle of the switches can be selected to control or regulate the output voltage. Examples of switching regulators include, for example, DC-DC converters such as buck converters and boost converters. Such converters can be used to convert a direct current (DC) signal from one voltage level to another. DC-DC converters can be useful in applications that use multiple sub-systems, such as can use or operate at different voltage levels or can be referenced to different voltage reference levels.

Some DC-DC converters can include or use a magnetic energy storage element, such as one or more inductors or transformers. In such an example, a converter output voltage can be controlled by modulating a duty cycle of the signal(s) used to control power switches for charging or discharging the inductive component(s). In an example, a buck converter or a boost converter can include or use a magnetic energy storage element.

Switching converters discussed herein can include or use a power domain isolation system without requiring a transformer. That is, one or more of the converters discussed herein can optionally operate to provide isolation between first (e.g., supply-side) and second (e.g., load-side) power domains without using a transformer. The first domain can operate or float around a first voltage level, such as relative to a first reference or ground, and the second domain can operate or float around a different second voltage level, such as relative to a different second reference.

In an example, a converter system can include an input network configured to receive or process signals from a first power domain, an output network configured to receive or process signals in a second power domain, and a reactive, energy-storing circuit coupled between the input and output networks. The input network can include a source input node and a source reference node. The source reference node can be a ground node, however, a different, non-ground reference can similarly be used. The source input node can be coupled to a first node of reactive circuit via a first current control circuit. The source reference node can be coupled to a second node of the reactive circuit via a second current control circuit. During a first phase of operation, the first current control circuit can electrically couple the source input node with the first node of the reactive circuit, and during the same first phase, the second current control circuit can electrically couple the source reference node with the second node of the reactive circuit. During a subsequent second phase of operation, the first and second current control circuits can electrically isolate the reactive circuit from the source input node and the source reference node. The subsequent second phase can immediately follow the first phase, or can optionally follow a blanking period that immediately follows the first phase.

The output network of the converter system can include an output signal node and an output reference node. The output signal node can be coupled through a third current control circuit to the first node of the reactive circuit, and the output reference node can be coupled through a fourth current control circuit to the second node of the reactive circuit. During the first phase of operation, the third and fourth current control circuits can electrically isolate the reactive circuit from the output signal node and from the output reference node. During the second phase, the third current control circuit can electrically couple the first node of the reactive circuit with the output signal node, and the fourth current control circuit can electrically couple the second node of the reactive circuit to the output reference node. The first and second phases, such as can have a blanking period between them, can be controlled according to a pulse width modulation (PWM) signal or other control signal that can be used to control the state of switches in the input and output network. In this manner, the reactive circuit can be used to store or communicate a power signal between the input and output networks, such as without requiring or using a transformer, and without electrically coupling the reference nodes of the input and output sides of the converter system during any phase of operation, including during blanking periods. The converter system can be configured to accommodate noise, or AC variation, or changes in reference levels at the input and output networks. In other words, the system can be configured to provide switched isolation, for example on the order of about 5, 10, 20, 30, 40, or more volts of isolation, between power domains, such as when one or both of the first and second power domains are referenced to other than earth ground.

In an example, a converter system that includes the input network, the output network, and the reactive circuit, can be configured for bidirectional operation such that energy provided at the output (e.g., as received from a particular source) can be transferred back to the input. In other words, current control circuitry in the input and output networks can be configured to block or inhibit current from flowing in either direction between the input and output networks.

In an example, the converter systems discussed herein can be configured for DC input and DC output, however, the converter systems discussed herein can similarly be used to transfer an AC input signal. That is, the converter systems discussed herein can be configured to control current flow in either direction and with respect to any polarity or polarity change.

Figure 1:
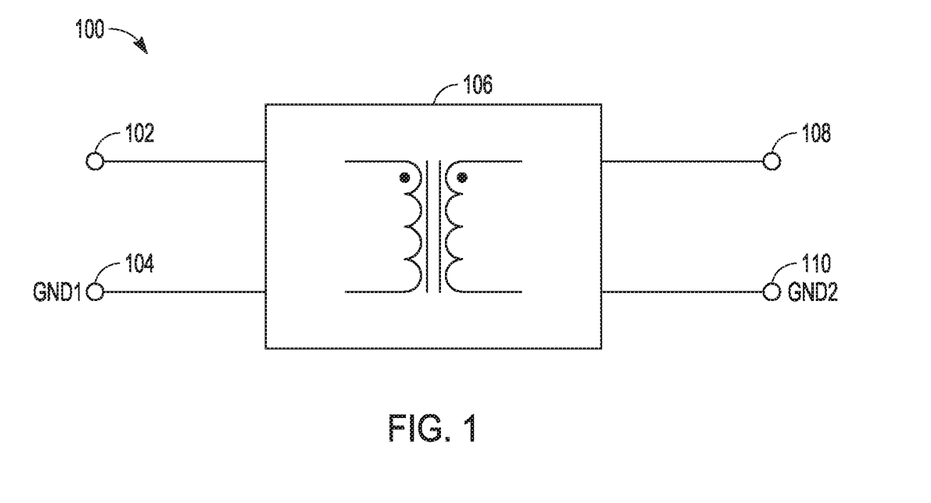
FIG. 1 illustrates generally an example of a transformer-based converter system.

FIG. 1 illustrates generally a block diagram representation of an example of a first converter system 100. The first converter system 100 can include a transformer-based converter 106. The transformer-based converter 106 can include a transformer that is coupled on a primary side of the transformer to a first input node 102 and a second input node 104, and that is coupled on a secondary side of the transformer to a first output node 108 and a second output node 110. Various examples of the first converter system 100 can include a buck converter, a boost converter, or other DC-DC converter.

In an example, the transformer-based converter 106 can be used to provide ground isolation between, for example, a first power domain that includes the first input node 102 and the second input node 104, and a second power domain that includes the first output node 108 and the second output node 110. A transformer, such as included in the transformer-based converter 106, can be physically large, heavy, expensive to build, and furthermore can be relatively inefficient at exchanging energy between the first and second power domains. In an example where transformer-based physical isolation is not required, a more efficient, inexpensive, and low-profile circuit isolation solution can include or use a switching converter or switched converter system.

Figure 2:
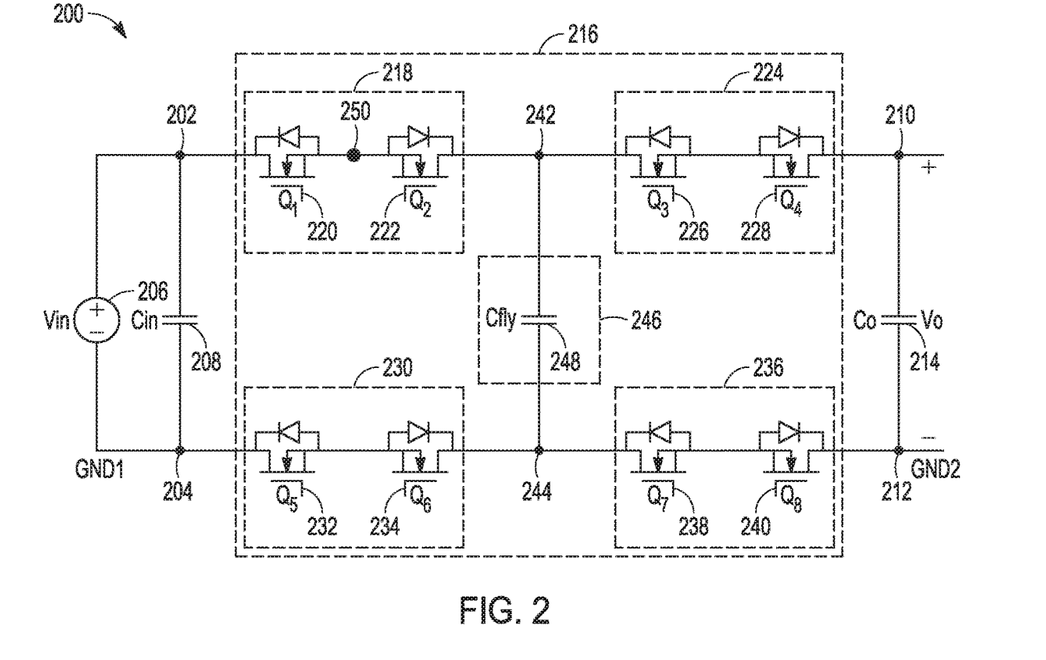
FIG. 2 illustrates generally an example of a first switched converter system.

FIG. 2 illustrates generally an example of a first switched converter system 200. The first switched converter system 200 can be configured to provide isolation between first and second power domains. In an example, the first switched converter system 200 can be used to provide power domain isolation in test equipment, in analog-to-digital signal converter circuits, or elsewhere.

The first switched converter system 200 can include a compound switching circuit 216, such as including one or more switches and a reactive circuit 246 that can be used to transfer signals between the first and second power domains in a controlled manner. A control circuit (see, e.g., FIG. 9) can be configured to provide control signals to the switches in the compound switching circuit 216, or to control one or more other aspects of the first switched converter system 200.

The first switched converter system 200 can include an input network for a first power domain. The input network can include a first input node 202, a second input node 204, and can optionally include an energy storage element such as an input capacitor 208 coupled between the first input node 202 and the second input node 204. In the example of FIG. 2, an input source 206 can be coupled in parallel with the input capacitor 208 to provide an input signal, Vin, to the first switched converter system 200. The input network can include a first current control circuit 218 coupled between the first input node 202 and a reactive circuit first node 242, and the input network can include a second current control circuit 230 coupled between the second input node 204 and a reactive circuit second node 244.

The first switched converter system 200 can include an output network for a second power domain. The output network can include a first output node 210, a second output node 212, and can optionally include an output capacitor 214 coupled between the first output node 210 and the second output node 212. The example of FIG. 2 includes the output capacitor 214 coupled between the first output node 210 and the second output node 212, with an output signal, Vout, imposed thereon. The output network can further include a third current control circuit 224 coupled between the reactive circuit first node 242 and the first output node 210, and a fourth current control circuit 236 coupled between the reactive circuit second node 244 and the second output node 212.

The various current control circuits (e.g., the first current control circuit 218, the second current control circuit 230, the third current control circuit 224, or the fourth current control circuit 236) can be similarly or differently configured. In the example of FIG. 2, the current control circuits are identically configured to each other, however, other configurations can be used. The current control circuits can be configured to receive respective control signals from a control circuit, such as the control circuit 902 in the example of FIG. 9, and in response to the respective control signals, one or more switches in each of the current control circuits can be caused to open (i.e., to be in a high impedance state) or to close (i.e., to be in a low impedance state to permit current flow therethrough).

In an example, the first current control circuit 218 includes a first switch 220 (Q1) and a second switch 222 (Q2). The first switch 220 and the second switch 222 can each comprise respective different instances of one or more semiconductor switch devices. That is, in an example, the first switch 220 can include one field effect transistor (FET) device or can include multiple, parallel-connected FET devices. The second switch 222 can similarly include a different FET device or different multiple parallel-connected FET devices. The various switch devices can include or comprise an n-type FET, a p-type FET, or other differently configured switch that can respond to changes in a control signal by changing between a low impedance (e.g., closed) or conducting state and a high impedance (open) or non-conducting state. In the example of FIG. 2, the first switch 220 and the second switch 222 include respective different n-type FET devices (or, in an example, include respective instances of multiple, parallel-coupled n-type FET devices).

In an example, the first switch 220 and the second switch 222 can include respective FET devices with respective body diodes. MOSFET devices, for example, can have an inherent body diode between the drain and the source. The body diode, sometimes call a parasitic diode or internal diode, is formed by the p-type and n-type material junction between the source and drain. Due to the body diode behavior of a FET device, a reverse-biased device can conduct current under some circumstances. To help address this problem and ensure electrical isolation along a conduction path, the first switched converter system 200 can include or use multiple FET devices in series with differently-oriented body diodes.

For example, in the first current control circuit 218, the first switch 220 and the second switch 222 can be coupled together at a switch-coupling node 250 and the devices can be provided in a back-to-back arrangement. For example, a body diode cathode terminal of the first switch 220 can be coupled to receive an input signal (e.g., from the first input node 202) and a body diode anode terminal of the first switch 220 can be coupled to the switch-coupling node 250. A body diode cathode terminal of the second switch 222 can be coupled to provide an intermediate output signal (e.g., to the reactive circuit first node 242) and a body diode anode terminal of the second switch 222 can be coupled to the switch-coupling node 250. In other words, the anode terminals of the body diodes of the first switch 220 and the second switch 222 can be coupled together when the first switch 220 and the second switch 222 are provided in a back-to-back arrangement. In other examples, cathode terminals of body diodes of the first switch 220 and the second switch 222 can be coupled together to provide substantially the same current-isolating behavior.

By providing the first switch 220 and the second switch 222 in a back-to-back configuration, the first current control circuit 218 can be configured to block current in both directions (e.g., along the current path between the first input node 202 and the reactive circuit first node 242) when the first switch 220 and the second switch 222 are off or are in a high impedance and non-conducting state. Other bi-directional current-blocking switches, such as comprising one or multiple discrete switch devices, can similarly be used. When used or switched together, the first switch 220 and the second switch 222 can configure the first current control circuit 218 to operate like an ideal single pole, single through (SPST) switch that permits current to flow (e.g., in either direction) when the first switch 220 and the second switch 222 are turned on or are in a low impedance state, and that inhibits current from flowing (e.g., in either direction) when the first switch 220 and the second switch 222 are turned off or are in a high impedance state.

In an example, one or more the second current control circuit 230, the third current control circuit 224, or the fourth current control circuit 236 can include respective different instances of the structures in the first current control circuit 218. That is, the second current control circuit 230 can include a fifth switch 232 (Q5) and the a sixth switch 234 (Q6) coupled together in a back-to-back configuration, the third current control circuit 224 can include a third switch 226 (Q3) and a fourth switch 228 (Q4) coupled together in a back-to-back configuration, and the fourth current control circuit 236 can include a seventh switch 238 (Q7) and an eighth switch 240 (Q8) coupled together in a back-to-back configuration. The various discrete switching devices that comprise the different current control circuits can be similarly or differently sized or configured, however, they can each be configured to block current flow in response to a respective control signal. In the example of FIG. 2, each pair of discrete switches can comprise a pair of back-to-back FET devices with oppositely-oriented body diodes.

The example of FIG. 2 includes the reactive circuit 246 coupled between the reactive circuit first node 242 and the reactive circuit second node 244. The reactive circuit 246 is generally configured to store and transfer energy between power domains, such as using the input and output networks of the first switched converter system 200. In an example, the reactive circuit 246 includes a first flying capacitor 248 that is configured to have a voltage level that changes or can "fly" between the power domains of the input and output networks. That is, a voltage can be stored by the first flying capacitor 248 during a first phase when the first flying capacitor 248 is coupled to a first reference, such as GND1 in the example of FIG. 2, and the voltage is configured to be discharged from the first flying capacitor 248 during a second phase when the first flying capacitor 248 is coupled to a different second reference, such as GND2 in the example of FIG. 2.

Figure 3:
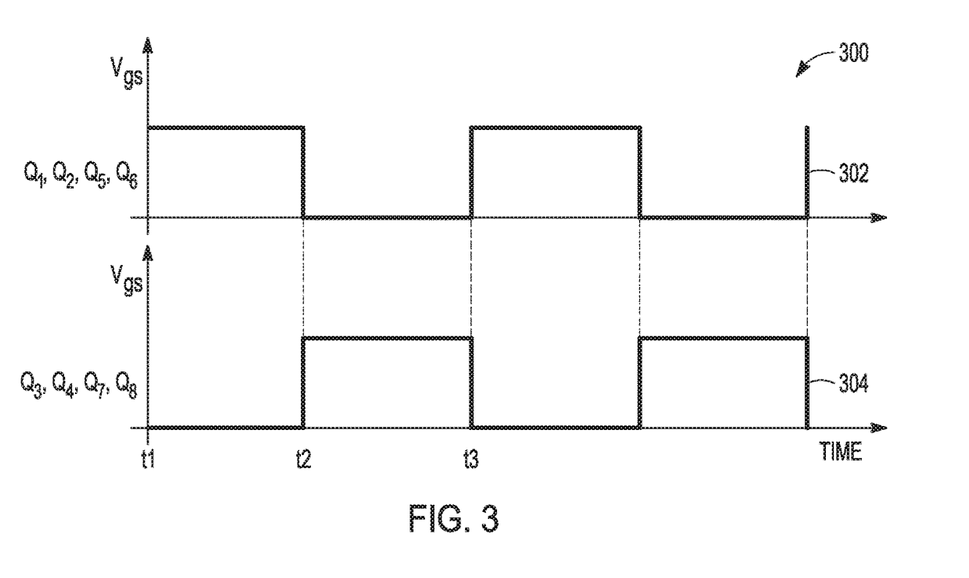
FIG. 3 illustrates generally an example of a first timing diagram in accordance with one embodiment.

FIG. 3 illustrates generally a first timing diagram 300 for respective control signals that can be provided to switches in the first switched converter system 200 of FIG. 2. Various operations of the first switched converter system 200 can be described or understood with reference to the control signals. The example of FIG. 3 includes a first PWM signal 302 having a first phase, and a second PWM signal 304 having a second phase that is opposite to the first phase. That is, when the first PWM signal 302 is logic high then the second PWM signal 304 is logic low, and vice versa.

In the example of FIG. 3, the first PWM signal 302 represents a logic signal or control signal that can be provided to the first switch 220 (Q1), the second switch 222 (Q2), the fifth switch 232 (Q5), and the sixth switch 234 (Q6). In an example, the control signal indicates a magnitude of a gate-source voltage, or Vgs signal, that can be provided to each of the designated switches to thereby cause the switches to maintain an open (i.e., high impedance) state or closed (i.e., low impedance) state. Similarly, the second PWM signal 304 represents a different logic signal or different control signal that can be provided to the third switch 226 (Q3), the fourth switch 228 (Q4), the seventh switch 238 (Q7) and the eighth switch 240 (Q8).

In the example of FIG. 3, the first PWM signal 302 is high during a first interval from time t1 to time t2, and is low during a subsequent interval from time t2 to time t3. In the same example, the second PWM signal 304 is low during the first interval and is high during the subsequent interval. Accordingly, during the first interval or first phase of operation, the switches in the first current control circuit 218 and the switches in the second current control circuit 230 can be on or closed to thereby permit current to flow between the first input node 202 and the reactive circuit first node 242 (e.g., via the first current control circuit 218) and to permit current to flow between the second input node 204 and the reactive circuit second node 244. An energy storage element such as the first flying capacitor 248 in the reactive circuit 246 can be charged during the first interval. During the same first interval or phase of operation, the switches in the third current control circuit 224 and the switches in the fourth current control circuit 236 can be off or open to thereby inhibit or prevent current from flowing away from the reactive circuit first node 242 and/or the reactive circuit second node 244. That is, the reactive circuit 246 can be electrically isolated from the output side of the first switched converter system 200.

Figure 4:
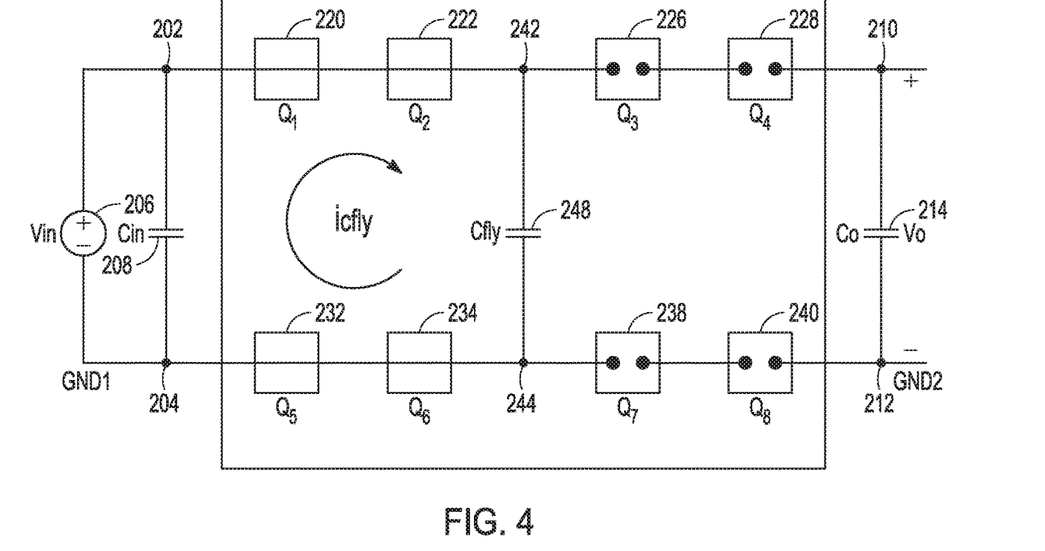
FIG. 4 illustrates generally an example of the first switched converter system during a first switching phase.

FIG. 4 illustrates generally a graphical representation of the states of the various switches in the first switched converter system 200 and signal flow during the first interval from time t1 to time t2 in the timing diagram of FIG. 3. In FIG. 4, each of the first switch 220, the second switch 222, the fifth switch 232, and the sixth switch 234 are represented as short circuits to indicate that a substantially unimpeded current path is provided between the first input node 202 and the reactive circuit first node 242, and a substantially unimpeded current path is provided between the second input node 204 and the reactive circuit second node 244. During the first interval or phase of operation, a current signal $i_{cfly}$ can be provided in the input network to charge the first flying capacitor 248 in the reactive circuit 246.

In the example of FIG. 4, each of the third switch 226, the fourth switch 228, the seventh switch 238, and the eighth switch 240 are represented as open circuits to indicate that a current path is not provided between the reactive circuit first node 242 and the first output node 210, and that a current path is not provided between the reactive circuit second node 244 and the second output node 212.

In an example, during the second interval or second phase of operation, the switches in the first current control circuit 218 and in the second current control circuit 230 can be off or open to inhibit or prevent current from flowing between the reactive circuit first node 242 and/or the reactive circuit second node 244. During the same second interval or second phase of operation, the switches in the third current control circuit 224 and the switches in the fourth current control circuit 236 can be on or closed to thereby permit current to flow between the reactive circuit 246 and the first output node 210 and the second output node 212. During the second interval or second phase of operation, in this example, an energy storage element such as the first flying capacitor 248 can be discharged via respective current paths through the third current control circuit 224 and through the fourth current control circuit 236 to thereby provide the output signal Vout at the output capacitor 214.

Figure 5:
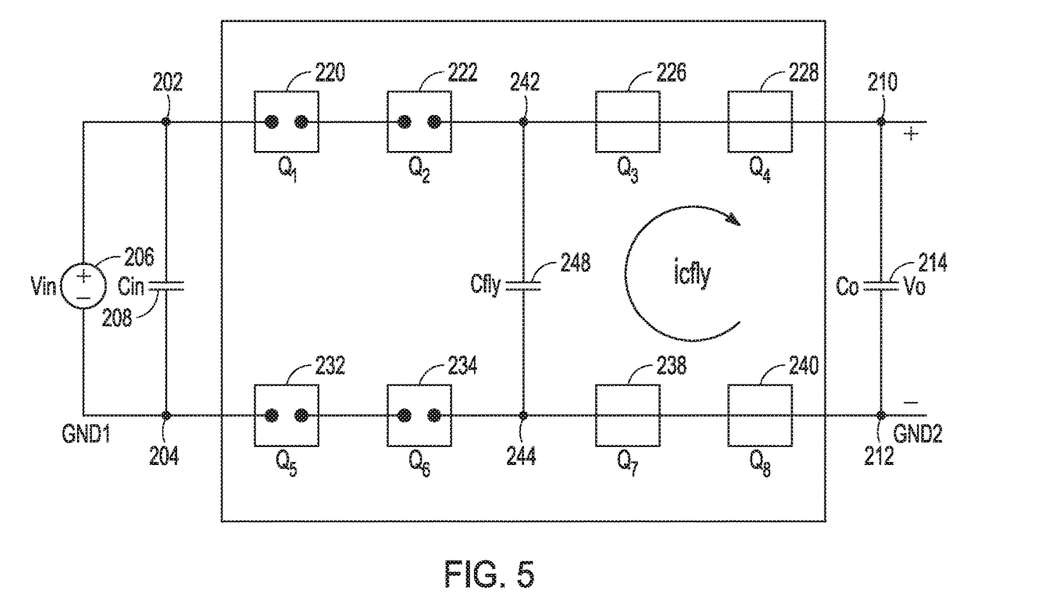
FIG. 5 illustrates generally an example of the first switched converter system during a second switching phase.

FIG. 5 illustrates generally a graphical representation the various switches in the output network and signal flow during the second interval from time t2 to time t3 in the timing diagram of FIG. 3. In FIG. 5, each of the first switch 220, the second switch 222, the fifth switch 232, and the sixth switch 234 are represented as open circuits to indicate that a current path is not provided between the first input node 202 and the reactive circuit first node 242, and a current path is not provided between the second input node 204 and the reactive circuit second node 244. In the example of FIG. 5, each of the third switch 226, the fourth switch 228, the seventh switch 238, and the eighth switch 240 are represented as short circuits to indicate that a current path is provided between the reactive circuit first node 242 and the first output node 210, and that a current path is provided between the reactive circuit second node 244 and the second output node 212. During the second interval or phase of operation, the current signal $i_{cfly}$ can thus be discharged using the output network, such as to discharge a signal stored by the first flying capacitor 248 in the reactive circuit 246. In an example, the output signal Vo can be provided as the current signal $i_{cfly}$ flows between the reactive circuit first node 242 and the output capacitor 214.

Figure 8:
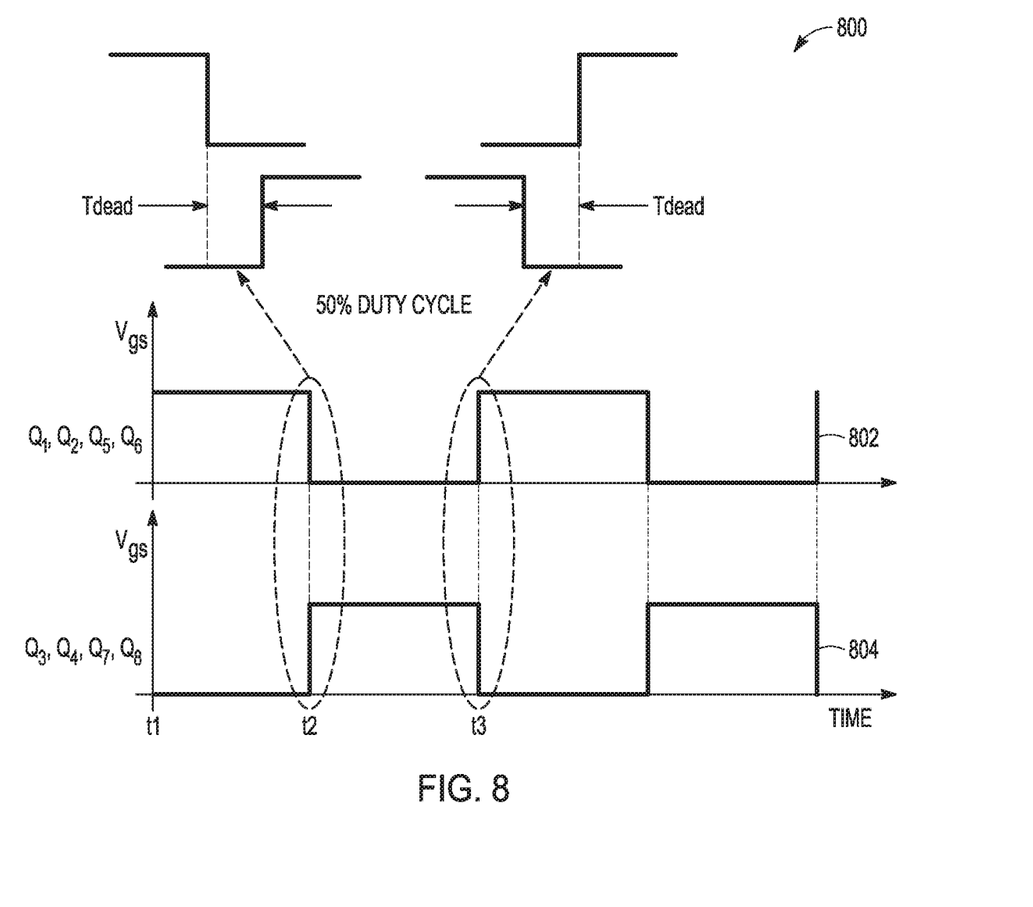
FIG. 8 illustrates generally an example of a second timing diagram in accordance with one embodiment.

In an example, the first PWM signal 302 and the second PWM signal 304 can include a blanking period, or dead time, between the first and second intervals. The blanking period can include a duration for which the first PWM signal 302 and the second PWM signal 304 are each in an off state such that each of the switches in the compound switching circuit 216 are off or are in a high impedance state at the same time. During the blanking period, the reactive circuit 246 can be substantially inhibited or prevented from discharging a voltage or current stored therein. FIG. 8, discussed below, illustrates generally an example of a PWM signal that includes a blanking period or dead time, Tdead.

In the example of FIG. 3, the duty cycle of the first PWM signal 302 and the second PWM signal 304 is about 50%. Generally, when substantially identical instances of the same FET or switch device are used as the switches in the various current control circuits, then an optimum duty cycle can be about 50%. In an example where one or more of the FET devices are not matched or have different size or function characteristics, then the duty cycle can change (e.g., to be other than about 50%) to help control or redistribute power losses. Other duty cycles or switching patterns can similarly be used.

Figure 6:
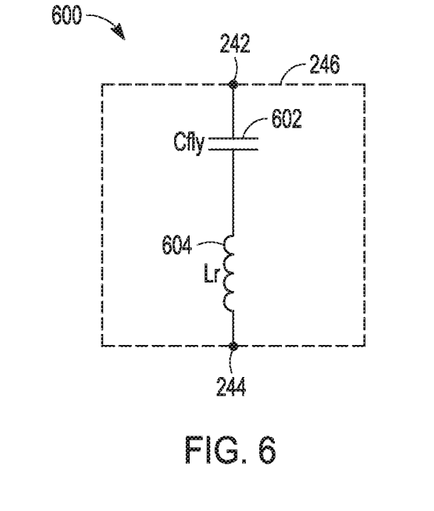
FIG. 6 illustrates generally an example of a first reactive circuit for use in the first switched converter system.

FIG. 6 illustrates generally a first reactive circuit example 600 such as for use in the first switched converter system 200. The first reactive circuit example 600 includes an embodiment of the reactive circuit 246 that includes a second flying capacitor 602 (Cfly) coupled in series with a first inductor 604 (Lr). A first side of the series-coupled second flying capacitor 602 and first inductor 604 can be coupled to the reactive circuit first node 242 and a second side of the series-coupled second flying capacitor 602 and first inductor 604 can be coupled to the reactive circuit second node 244. The first reactive circuit example 600 thus includes an LC resonant tank circuit that can be used to store energy in switching signals between power domains. The second flying capacitor 602 can comprise the first flying capacitor 248 from the example of FIG. 2 or can comprise a different capacitor.

In the example of FIG. 6, a value of the first inductor 604 can be relatively small due to a small voltage-second on the inductor. A switching frequency, Fsw, for the first switched converter system 200 that includes or uses the first reactive circuit example 600 can be determined as Fsw=2(π)√(Lr*Cfly). In an example, the switching frequency can be on the order of several hundred kilohertz.

Figure 7:
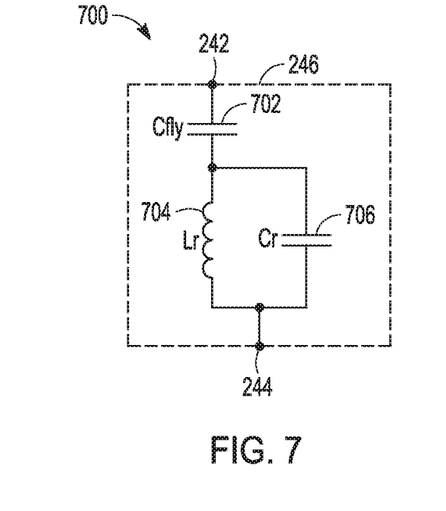
FIG. 7 illustrates generally an example of a second reactive circuit for use in the first switched converter system.

FIG. 7 illustrates generally a second reactive circuit example 700 such as for use in the first switched converter system 200. The second reactive circuit example 700 includes an embodiment of the reactive circuit 246 that includes a multiple-resonance circuit, such as including a third flying capacitor 702 (Cfly) coupled in series with a parallel-coupled LC tank circuit that includes a second inductor 704 (Lr) in parallel with a tank capacitor 706 (Cr). The second reactive circuit example 700 thus includes series and parallel LC tank circuits that can be used to store energy in switching signals between power domains. The third flying capacitor 702 can comprise the first flying capacitor 248 from the example of FIG. 2 or can comprise a different capacitor. In an example, the tank capacitor 706 includes a capacitor having a capacitance value that is substantially less than a capacitance value of the third flying capacitor 702.

In the example of FIG. 7, a value for the tank capacitor 706 can be selected based on a blanking period or dead time, Tdead, between pulses in PWM control signals, such as can be provided between the conclusion of the first interval at time t2 and the beginning of the subsequent interval. FIG. 8 illustrates generally an example of a second timing diagram 800 that includes a blanking period or dead time. The value for the tank capacitor 706 or Cr can be determined as $Cr=(Tdead^2)/(\pi^2 Lr)$. In the example of FIG. 8, a third PWM signal 802 can correspond generally to the first PWM signal 302, and a fourth PWM signal 804 can correspond generally to the second PWM signal 304.

Figure 9:
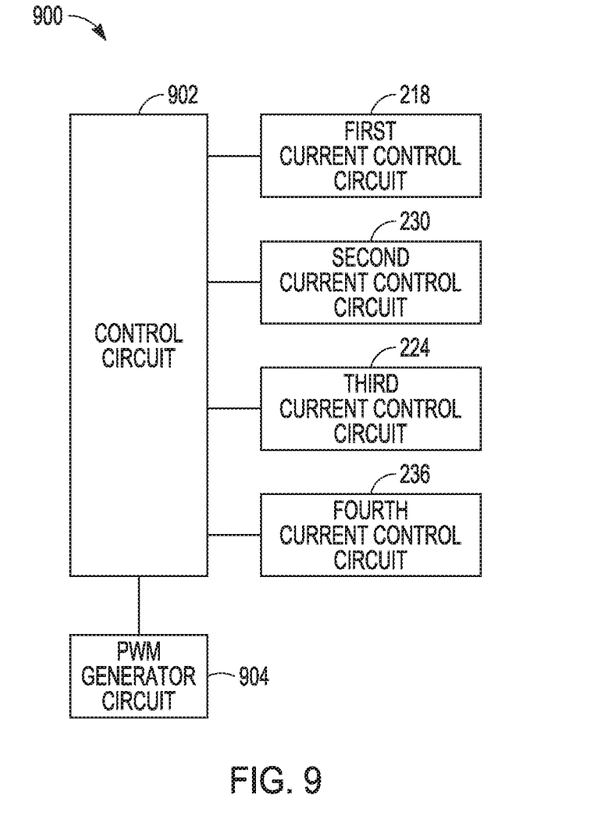
FIG. 9 illustrates generally an example of a control diagram for a switched converter system.

FIG. 9 illustrates generally an example of a schematic control diagram 900 such as for the first switched converter system 200. The schematic control diagram 900 includes a control circuit 902, a PWM generator circuit 904, and various current control circuits. In an example, the control circuit 902 can include a general purpose or purpose-built (e.g., an ASIC) processor circuit configured to provide switch control signals to the various current control circuits. The control circuit 902 can optionally receive other control signals from elsewhere in a system to facilitate or coordinate switching signals between the power domains to which the first switched converter system 200 is coupled.

In the example of FIG. 9, the control circuit 902 can receive a PWM signal from the PWM generator circuit 904. The control circuit 902 can be configured to route the received PWM signal, or route another signal based on the received PWM signal, to one or more of the first current control circuit 218, the second current control circuit 230, the third current control circuit 224, or the fourth current control circuit 236. In an example, the control circuit 902 can be configured to provide substantially a first control signal to the first current control circuit 218 and the third current control circuit 224 (e.g., the first control signal corresponding to the first PWM signal 302 or the third PWM signal 802), and the control circuit 902 can be configured to provide substantially a second control signal to the second current control circuit 230 and the fourth current control circuit 236 (e.g., the second control signal corresponding to the second PWM signal 304 or the fourth PWM signal 804). In an example, the control circuit 902 can be configured to provide respective different current control signals to the current control circuits, or can be configured to provide respective different current control signals to the switches in each of the current control circuits. As an example, the control circuit 902 can be configured to provide the same or different PWM control signal to the first switch 220 and the second switch 222 in the first current control circuit 218, and can be configured to provide further similar or different PWM control signals to the third switch 226 and the fourth switch 228 in the third current control circuit 224, and so on.

In an example, the first switched converter system 200 can be packaged in a single integrated circuit (IC), or components of the first switched converter system 200 can be grouped into discrete ICs. In an example, an integrated solution can include the various switching circuits, the control circuit 902, or the PWM generator circuit 904. Accordingly the first switched converter system 200, such as with or without the control circuit 902 or the PWM generator circuit 904, can have a low-profile or small physical size and small area footprint, such as can be substantially smaller than a similar converter device that includes or uses a transformer.

In an example, two or more of the switch devices, such as can comprise devices in one or more of the first current control circuit 218, the third current control circuit 224, the second current control circuit 230, or the fourth current control circuit 236, can be provided on a common IC. In an example, multiple switch devices, such as MOSFET devices, can be built symmetrically and can have coupled structures, such as using a common well to facilitate increased device density and help further improve manufacturing efficiency.

In an example, the first switched converter system 200 can be configured to provide isolation between a first power domain or power supply (e.g., operative relative to a first reference level) that operates at or around 45-75 volts and a second power domain, such as a test environment, such as can be operative at substantially the same voltage but can have a different reference level. In an example, the input capacitor 208, the output capacitor 214, and the reactive circuit 246 can have substantially the same voltage but can have different reference levels. In an example, the input capacitor 208 and the output capacitor 214 can be similarly valued, such as around 80 uF (e.g., rated at about 100V). An example value for the first flying capacitor 248 can be about 35-75 uF (e.g., rated at about 100V). Discrete switch devices in the first current control circuit 218, second current control circuit 230, third current control circuit 224, or fourth current control circuit 236 (e.g., Q1-Q8) can include respective n-type MOSFET devices (e.g., rated at about 30V and 100 A). In this example, the first switched converter system 200 can be configured to provide an output current at the first output node 210 up to about 18 amps and can provide up to about 900 watts of power, and can provide up to about 20 volts of isolation between the first and second power domains. That is, the example can accommodate AC noise or signal variation in the respective references of the first and second power domains, such as a difference between a signal level at the second input node 204 and at the second output node 212. In this example, the control signals from control circuit 902 to the switches can operate at about 300 kHz.

Various aspects of the present disclosure can help provide a solution to the test system-related problems identified herein. In an example, Aspect 1 can include or use subject matter (such as an apparatus, a system, a device, a method, a means for performing acts, or a device readable medium including instructions that, when performed by the device, can cause the device to perform acts, or an article of manufacture), such as can include or use a power domain isolation system. In an example, Aspect 1 can include a system that does not require or use a transformer. Aspect 1 can include a reactive circuit, and an input network and an output network. The input network can have first and second input nodes that are coupled in parallel with the reactive circuit via respective first and second current control circuits, and the output network can have first and second output nodes that are coupled in parallel with the reactive circuit via respective third and fourth current control circuits. In Aspect 1, the first and second current control circuits are configured to couple the reactive circuit to the input nodes when the third and fourth current control circuits are configured to electrically isolate the reactive circuit from the output nodes, and the first and second current control circuits are configured to electrically isolate the reactive circuit from the input nodes when the third and fourth current control circuits are configured to couple the reactive circuit to the output nodes.

Aspect 2 can include or use, or can optionally be combined with the subject matter of Aspect 1, to optionally include the first and second current control circuits configured to couple the reactive circuit to the input nodes during a first phase, and the first and second current control circuits are configured to electrically isolate the reactive circuit from the input nodes during a second phase, and the first and second phases are non-overlapping in time.

Aspect 3 can include or use, or can optionally be combined with the subject matter of one or any combination of Aspects 1 or 2 to optionally include a processor circuit configured to provide respective control signals to each of the first, second, third, and fourth current control circuits to selectively enable or disable current flow therethrough.

Aspect 4 can include or use, or can optionally be combined with the subject matter of one or any combination of Aspects 1 through 3 to optionally include each of the first, second, third, and fourth current control circuits comprising a respective pair of back-to-back FET devices.

Aspect 5 can include or use, or can optionally be combined with the subject matter of Aspect 4, to optionally include, in the first current control circuit, a first FET device having a body diode cathode coupled to the first input node and a body diode anode coupled to a first intermediate node, and a second FET device having a body diode cathode coupled a terminal of the reactive circuit and a body diode anode coupled to the first intermediate node.

Aspect 6 can include or use, or can optionally be combined with the subject matter of Aspect 4, to optionally include each of the first, second, third, and fourth current control circuits comprising a respective different instance of first and second FET devices, wherein an anode terminal of a body diode of the first FET device is coupled to an anode terminal of a body diode of the second FET device.

Aspect 7 can include or use, or can optionally be combined with the subject matter of Aspect 4, to optionally include a processor circuit configured to provide substantially the same first PWM control signals to each of the FET devices in the first and second current control circuits, and to provide second PWM control signals to each of the FET devices in the third and fourth current control circuits. The first and second PWM control signals can be substantially out of phase with each other.

Aspect 8 can include or use, or can optionally be combined with the subject matter of Aspect 7, to optionally include the processor circuit configured to provide a blanking period between transitions in the first and second PWM control signals, wherein during the blanking period the control signals command all of the FET devices to be in a high impedance state.

Aspect 9 can include or use, or can optionally be combined with the subject matter of one or any combination of Aspects 1 through 8 to optionally include or use a capacitor as a component of the reactive network.

Aspect 10 can include or use, or can optionally be combined with the subject matter of Aspect 9, to optionally include the capacitor coupled in series with at least one of an inductor and a parallel inductor-capacitor (LC) tank circuit.

Aspect 11 can include or use, or can optionally be combined with the subject matter of one or any combination of Aspects 1 through 10 to optionally include or use the input nodes configured to receive a source signal having a first reference voltage level and the output nodes configured to provide an output signal at a different second reference voltage level.

Aspect 12 can include or use, or can optionally be combined with the subject matter of Aspect 11, to optionally include a magnitude difference between the source signal and the output signal is less than about 10 volts but can be up to about 50 volts or more.

Aspect 13 can include or use, or can optionally be combined with the subject matter of Aspect 12, to optionally include the reactive circuit comprising a flying capacitor coupled between the first and second terminals, and switches in the first, second, third, and fourth current control circuits having a switching frequency between about 300 kHz to 400 kHz and a duty cycle of about 50%.

Aspect 14 can include or use subject matter (such as an apparatus, a system, a device, a method, a means for performing acts, or a device readable medium including instructions that, when performed by the device, can cause the device to perform acts, or an article of manufacture), such as can include or use a transformerless power domain isolation system. In an example, Aspect 14 can include a power domain switching module for decoupling an input power signal having a first reference level from an output power signal having a second reference level, wherein a difference between the first and second reference levels is between about 1 and 10 volts. In Aspect 14, the module can include a signal-side isolation path comprising at least first and second back-to-back FET assemblies coupled in series between a signal-side input node and a signal-side output node, and a reference-side isolation path comprising at least third and fourth back-to-back FET assemblies coupled in series between a reference-side input node and a reference-side output node. Aspect 14 can further include an energy storage circuit coupled to a first intermediate node in the signal-side isolation path between the first and second FET assemblies, and coupled to a second intermediate node in the reference-side isolation path between the third and fourth FET assemblies.

Aspect 15 can include or use, or can optionally be combined with the subject matter of Aspect 14, to optionally include or use, in a first operating mode, the first and third back-to-back FET assemblies are configured in a low impedance or conducting state and the second and fourth back-to-back FET assemblies are configured in a high impedance or non-conducting state, and in a second operating mode that is mutually exclusive with the first operating mode, the first and third back-to-back FET assemblies are configured in a high impedance state and the second and fourth back-to-back FET assemblies are configured in a low impedance state.

Aspect 16 can include or use, or can optionally be combined with the subject matter of Aspect 14 or Aspect 15, to optionally include each of the back-to-back FET assemblies comprising first and second FET devices coupled in series and having oppositely oriented body diodes.

Aspect 17 can include or use, or can optionally be combined with the subject matter of Aspect 16, to optionally include or use, a processor circuit configured to provide first PWM control signals to the FET devices in the first and third FET assemblies, and to provide second PWM control signals to the FET devices in the second and fourth FET assemblies, wherein the PWM control signals have a duty cycle of about 50%.

Aspect 18 can include or use, or can optionally be combined with the subject matter of Aspect 17, to optionally include or use the processor circuit configured to provide the first and second PWM signals with a blanking period between adjacent pulses.

Aspect 19 can include or use subject matter (such as an apparatus, a system, a device, a method, a means for performing acts, or a device readable medium including instructions that, when performed by the device, can cause the device to perform acts, or an article of manufacture), such as can include or use a power domain isolation system. In an example, Aspect 19 can include or use, or can optionally be combined with the subject matter of one or more of Aspects 1-18, to optionally include an integrated circuit for use in a power domain isolation device without requiring a transformer, the power domain isolation device comprising a power signal input and a power signal output, wherein the power signal input is configured to receive an input signal referenced to a first voltage level and the power signal output is configured to provide an output signal referenced to a different voltage level. In Aspect 19, the integrated circuit can include a first pair of series-coupled FET devices coupled between a first terminal of the power signal input and an intermediate node, a second pair of series-coupled FET devices coupled between a reference terminal of the power signal input and a flying reference node, a third pair of series-coupled FET devices coupled between the intermediate node and a first terminal of the power signal output; and a fourth pair of series-coupled FET devices coupled between the flying reference node and a reference terminal of the power signal output.

Aspect 20 can include or use, or can optionally be combined with the subject matter of Aspect 19, to optionally include or use each of the first, second, third, and fourth pairs of series-coupled FET devices comprising a first FET and a second FET having respective first and second characteristic body diodes, wherein an anode terminal of the body diode of the first FET is coupled to an anode terminal of the body diode of the second FET.

Aspect 21 can include or use subject matter (such as an apparatus, a system, a device, a method, a means for performing acts, or a device readable medium including instructions that, when performed by the device, can cause the device to perform acts, or an article of manufacture), such as can include or use a power domain isolation system. In an example, Aspect 21 can include or use, or can optionally be combined with the subject matter of one or more of Aspects 1-20, to optionally include a power domain isolation system without requiring a transformer, the system comprising a reactive circuit having first and second nodes, and an input network including a source input node and a source reference node, wherein the source input node is coupled through a first current control circuit to the first node of the reactive circuit, the source reference node is coupled through a second current control circuit to the second node of the reactive circuit, and during a first phase, the first current control circuit is configured to electrically couple the source input node and first node of the reactive circuit, and the second current control circuit is configured to electrically couple the source reference node to the second node of the reactive circuit, and during a second phase, the first and second current control circuits are configured to electrically isolate the reactive circuit from the source input node and the source reference node. Aspect 21 can include an output network including an output signal node and an output reference node, wherein the output signal node is coupled through a third current control circuit to the first node of the reactive circuit, the output reference node is coupled through a fourth current control circuit to the second node of the reactive circuit, and during the first phase, the third and fourth current control circuits are configured to electrically isolate the reactive circuit from the output signal node and the output reference node, and during the second phase, the third current control circuit is configured to electrically couple the first node of the reactive circuit and the output signal node, and the fourth current control circuit is configured to electrically couple the second node of the reactive circuit to the output reference node.

Each of these non-limiting Aspects can stand on its own, or can be combined in various permutations or combinations with one or more of the other Aspects, examples, or features discussed elsewhere herein.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method or process examples described herein, such as including examples related to switch control in a converter system, can be machine or computer-implemented at least in part. Some examples can include a computer-readable medium or machine-readable medium encoded with instructions operable to configure an electronic device to perform methods or circuit operations or circuit configuration instructions as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A power domain isolation system without requiring a transformer, the system configured for bidirectional power signal communication between first and second power domains, the system comprising:
   a reactive circuit;
   an input network coupled to the first power domain and having first and second input nodes that are coupled in parallel with the reactive circuit via respective first and second current control circuits; and
   an output network coupled to the second power domain and having first and second output nodes that are coupled in parallel with the reactive circuit via respective third and fourth current control circuits;
   wherein the first and second current control circuits are configured to couple the reactive circuit to the input nodes when the third and fourth current control circuits are configured to electrically isolate the reactive circuit from the output nodes;
   wherein the first and second current control circuits are configured to electrically isolate the reactive circuit from the input nodes when the third and fourth current control circuits are configured to couple the reactive circuit to the output nodes; and
   wherein at least one of the first, second, third, and fourth current control circuits comprises back-to-back first and second FET devices, wherein the first FET device has a body diode cathode coupled to the first input node and a body diode anode coupled to a first intermediate node, and the second FET device has a body diode cathode coupled to a terminal of the reactive circuit and a body diode anode coupled to the first intermediate node.

2. The system of claim 1, wherein the first and second current control circuits are configured to couple the reactive circuit to the input nodes during a first phase, wherein the first and second current control circuits are configured to electrically isolate the reactive circuit from the input nodes during a second phase, and wherein the first and second phases are non-overlapping in time.

3. The system of claim 1, further comprising a processor circuit configured to provide respective control signals to each of the first, second, third, and fourth current control circuits to selectively enable or disable current flow therethrough.

4. The system of claim 1, wherein each of the first, second, third, and fourth current control circuits comprises a respective pair of back-to-back FET devices.

5. The system of claim 4, wherein each of the first, second, third, and fourth current control circuits comprises a respective different instance of first and second FET devices, wherein an anode terminal of a body diode of the first FET device is coupled to an anode terminal of a body diode of the second FET device.

6. The system of claim 4, further comprising a processor circuit configured to provide substantially a same first PWM control signals to each of the FET devices in the first and second current control circuits, and to provide second PWM control signals to each of the FET devices in the third and fourth current control circuits.

7. The system of claim 6, wherein the processor circuit is configured to provide a blanking period between transitions in the first and second PWM control signals, wherein during the blanking period the control signals command all of the FET devices to be in a high impedance state.

8. The system of claim 1, wherein the reactive network comprises a capacitor.

9. The system of claim 8, wherein the reactive network comprises the capacitor coupled in series with at least one of an inductor and a parallel inductor-capacitor (LC) circuit.

10. The system of claim 1, wherein the input nodes are configured to receive a source signal having a first reference voltage level and the output nodes are configured to provide an output signal at a different second reference voltage level.

11. The system of claim 10, wherein a magnitude difference between the source signal and the output signal is less than about 10 volts.

12. The system of claim 11, wherein:
the reactive circuit comprises a flying capacitor coupled between the first and second terminals; and
switches in the first, second, third, and fourth current control circuits have a switching frequency between about 300 kHz to 400 kHz and a duty cycle of about 50%.

13. A power domain switching module for decoupling a first power signal having a first reference level from a second power signal having a second reference level, wherein a difference between the first and second reference levels is between about 1 and 10 volts, the module comprising:
a bidirectional signal-side isolation path comprising at least first and second back-to-back FET assemblies coupled in series between a signal-side first node and a signal-side second node, wherein a first FET of the first back-to-back FET assembly has a body diode cathode coupled to the signal-side first node and a body diode anode coupled to a first intermediate node and a second FET of the first back-to-back FET assembly has a body diode anode coupled to the first intermediate node;
a bidirectional reference-side isolation path comprising at least third and fourth back-to-back FET assemblies coupled in series between a reference-side first node and a reference-side second node; and
an energy storage circuit coupled to a first intermediate node in the signal-side isolation path between the first and second FET assemblies, and coupled to a second intermediate node in the reference-side isolation path between the third and fourth FET assemblies.

14. The module of claim 13, wherein:
in a first operating mode, the first and third back-to-back FET assemblies are configured in a low impedance state and the second and fourth back-to-back FET assemblies are configured in a high impedance state, and
in a second operating mode that is mutually exclusive with the first operating mode, the first and third back-to-back FET assemblies are configured in a high impedance state and the second and fourth back-to-back FET assemblies are configured in a low impedance state.

15. The module of claim 13, wherein each of the back-to-back FET assemblies comprises first and second FET devices coupled in series and having oppositely oriented body diodes.

16. The module of claim 15, further comprising a processor circuit configured to provide first PWM control signals to the FET devices in the first and third FET assemblies, and to provide second PWM control signals to the FET devices in the second and fourth FET assemblies, wherein the PWM control signals have a duty cycle of about 50%.

17. The module of claim 16, wherein the processor circuit is configured to provide the first and second PWM signals with a blanking period between adjacent pulses.

18. An integrated circuit for use in a power domain isolation device without requiring a transformer, the power domain isolation device comprising a power signal input and a power signal output, wherein the power signal input is configured to receive an input signal referenced to a first voltage level and the power signal output is configured to provide an output signal referenced to a different voltage level, the integrated circuit comprising:
a first pair of series-coupled FET devices coupled between a first terminal of the power signal input and an intermediate node, wherein a first FET of the first pair of series-coupled FET devices has a body diode cathode coupled to the first input node and a body diode anode coupled to a first intermediate node and a second FET of the first pair of series-coupled FET devices has a body diode cathode coupled to the first terminal node and a body diode anode coupled to the first intermediate node;
a second pair of series-coupled FET devices coupled between a reference terminal of the power signal input and a flying reference node;
a third pair of series-coupled FET devices coupled between the intermediate node and a first terminal of the power signal output; and
a fourth pair of series-coupled FET devices coupled between the flying reference node and a reference terminal of the power signal output.

19. The integrated circuit of claim 18, wherein each of the second, third, and fourth pairs of series-coupled FET devices comprises a first FET and a second FET having respective first and second characteristic body diodes, wherein an anode terminal of the body diode of the first FET is coupled to an anode terminal of the body diode of the second FET.

* * * * *